(12) United States Patent
Mori

(10) Patent No.: US 6,602,480 B1
(45) Date of Patent: Aug. 5, 2003

(54) METHOD FOR TREATING WASTE GAS CONTAINING FLUOROCHEMICAL

(75) Inventor: Yoichi Mori, Kanagawa (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/763,126

(22) PCT Filed: Aug. 5, 1999

(86) PCT No.: PCT/JP99/04224
§ 371 (c)(1),
(2), (4) Date: Feb. 20, 2001

(87) PCT Pub. No.: WO00/09258
PCT Pub. Date: Feb. 24, 2000

(30) Foreign Application Priority Data

Aug. 17, 1998 (JP) .......................................... 10-244356
Mar. 4, 1999 (JP) .......................................... 11-056754

(51) Int. Cl.⁷ ................................................. C01B 7/19
(52) U.S. Cl. .................... 423/240 S; 588/248; 423/483
(58) Field of Search ........................ 423/240 S, 240 R, 423/483, 484, 486, 487, 488; 588/248

(56) References Cited

U.S. PATENT DOCUMENTS

| | | | |
|---|---|---|---|
| 3,773,633 A | * 11/1973 | Teller | .......................... 205/391 |
| 3,907,971 A | 9/1975 | Böhm et al. | |
| 4,065,271 A | 12/1977 | Weckesser et al. | |
| 5,779,998 A | * 7/1998 | Tom | ............................. 423/210 |
| 2001/0001652 A1 | * 5/2001 | Kanno et al. | ............. 423/240 S |

FOREIGN PATENT DOCUMENTS

| | | |
|---|---|---|
| EP | 0 412 456 | 2/1991 |
| EP | 0 470 573 | 2/1992 |
| EP | 0 485 787 | 5/1992 |
| EP | 0 748 649 | 12/1996 |
| EP | 0 916 388 | 5/1999 |
| JP | 3-47516 | 2/1991 |
| JP | 10-192653 | 7/1998 |
| JP | 11-70322 | 3/1999 |

OTHER PUBLICATIONS

H. Shimizu, pp. 792–795, "Handbook of Adsorption Technique", Feb. 2, 1993 (with partial English translation).

* cited by examiner

Primary Examiner—Stanley S. Silverman
Assistant Examiner—Edward M. Johnson
(74) Attorney, Agent, or Firm—Oblon, Spivak, McClelland, Maier & Neustadt, P.C.

(57) ABSTRACT

A method for decomposing a fluorine-containing compound by contacting an exhaust gas 1 containing a fluorine-containing compound, such as $C_2F_6$, with aluminum oxide 3, such as γ-alumina, which has been heated to a high temperature of, for example, 800° C. to 900° C. There may be such a necessary or larger number of moles of $H_2$ that the fluorine atoms in the fluorine-containing compound become HF. The method has a high decomposition rate of a fluorine-containing compound, a long life, and involves minimal occurrence of CO.

14 Claims, 4 Drawing Sheets

METHOD FOR TREATING WASTE GAS CONTAINING FLUOROCHEMICAL

TECHNICAL FIELD OF THE INVENTION

The present invention relates to a method and an apparatus for treating an exhaust gas containing a fluorine-containing compound. More particularly, the invention relates to a treatment method and a treatment apparatus for efficiently decomposing $C_2F_6$, $C_3F_8$, $CF_4$, $CHF_3$, $SF_6$ or $NF_3$ which is discharged in the step of dry cleaning the internal surface, etc. of a chamber or the like of semiconductor manufacturing equipment with the use of $C_2F_6$, $C_3F_8$, $CF_4$, $CHF_3$, $SF_6$ or $NF_3$ in the semiconductor industry, or during etching of various films on a semiconductor device.

PRIOR ART

In the semiconductor industry, many kinds of hazardous gases are used in the semiconductor manufacturing process, arousing concern for environmental contamination by them. $C_2F_6$, contained in an exhaust gas from a chemical vapor deposition (CVD) step and an etching step, acts as a global warming gas, and the establishment of a system for its removal is considered to be an urgent task.

In dry etching a silicon wafer or the like with the use of a manufacturing apparatus for a semiconductor device, such as an etching apparatus, for example, fluorinated hydrocarbons, such as $CF_4$, $CHF_3$, and $C_2F_6$, are used. In an exhaust gas from the etching apparatus, fluorinated hydrocarbons, such as $CF_4$, $CHF_3$, and $C_2F_6$, are contained.

An exhaust gas containing a fluorine-containing compound may be discharged during cleaning of a manufacturing apparatus for a semiconductor device. To form a thin film on a semiconductor substrate, a chemical vapor deposition apparatus is used as a semiconductor device manufacturing apparatus. When thin films adhering to a chamber and an internal surface of piping in the chemical vapor deposition apparatus are cleaned with a $ClF_3$ gas, an exhaust gas including various fluorine-containing gases is discharged from the chemical vapor deposition apparatus.

Various decomposition techniques and recovery techniques have been proposed as methods for treating fluorine-containing compounds such as $C_2F_6$. As the decomposition technology, in particular, the use of compounds, such as Pt catalysts, zeolite-based catalysts, activated carbon, active alumina, alkali metals, alkaline earth metals, and metal oxides, is named as a method of catalytic thermal decomposition. However, none of methods using them have been found effective.

Of the conventional technologies, the method of catalytic thermal decomposition comprises decomposing $C_2F_6$ by passing it through a heated catalyst. However, all of the methods of this type have involved drawbacks, such as a low decomposition rate, a short life of the treating agent, and occurrence of carbon monoxide (CO) as a by-product which is difficult to treat.

Under these circumstances, the present invention aims to solve the above-described problems with the earlier technologies, and provide a method and an apparatus for treating an exhaust gas containing a fluorine-containing compound, the method and apparatus having a high decomposition rate, being effective for long periods, and involving minimal occurrence of carbon monoxide (CO).

SUMMARY OF THE INVENTION

According to an aspect of the present invention, there is provided a method for decomposing a fluorine-containing compound in an exhaust gas by contacting the exhaust gas containing the fluorine-containing compound with aluminum oxide at a high temperature enough to decompose the fluorine-containing compound.

In the present invention, the above contacting step is preferably performed in the presence of a hydrogen gas ($H_2$) in a molar amount in excess of the amount required to convert the fluorine atoms in the fluorine-containing compound to HF. More preferably, the contacting step is performed in the presence of 1.5 or more times as many as the molar amount of a hydrogen gas ($H_2$) required to convert the fluorine atoms in the fluorine-containing compound to HF.

Preferably, the contacting step is performed in the presence of an oxygen gas whose amount is not less than the number of moles of the hydrogen gas.

Preferably, the fluorine-containing compound contains a carbon atom, a sulfur atom, or a nitrogen atom, and the contacting step is performed in the presence of an oxygen gas ($O_2$) in a molar amount in excess of the amount required to convert the carbon atom to $CO_2$, the sulfur atom to $SO_2$, or the nitrogen atom to $NO_2$.

The aluminum oxide preferably includes γ-alumina. Preferably, the aluminum oxide is particulate.

The high temperature is preferably in the temperature range of about 800° C. to about 900° C.

The fluorine-containing compound preferably includes $C_2F_6$, $C_3F_8$, $CF_4$, $CHF_3SF_6$ or $NF_3$. The exhaust gas preferably has been discharged from a semiconductor device manufacturing apparatus.

It is preferred to remove a catalytic poison to the aluminum oxide from the exhaust gas, and then perform the contacting step. It is further preferred to remove $SiF_4$ from the exhaust gas, and then perform the contacting step.

Preferably, the step of removing an acidic gas is present after the contacting step. Further preferably, the acidic gas is removed using water.

According to another aspect of the present invention, there is provided an apparatus for treating an exhaust gas containing a fluorine-containing compound, which includes a vessel for accommodating aluminum oxide, and a passage for passing the exhaust gas containing the fluorine-containing compound into the vessel.

In the present invention, it is preferred to further include a heater capable of heating the aluminum oxide to a high temperature enough to decompose the fluorine-containing compound.

It is preferred to further include a feeder for feeding a hydrogen gas ($H_2$) in a molar amount in excess of the amount required to convert the fluorine atoms in the fluorine-containing compound to HF.

Preferably, a feeder for feeding an oxidizing agent is further included.

Preferably, the fluorine-containing compound contains a carbon atom, a sulfur atom, or a nitrogen atom, and there is further included a feeder for feeding $O_2$ in a molar amount in excess of the amount required to convert the carbon atom to $CO_2$, the sulfur atom to $SO_2$, or the nitrogen atom to $NO_2$.

The aluminum oxide preferably includes γ-alumina. More preferably, the aluminum oxide is particulate.

The passage is preferably connected to an outlet of a semiconductor device manufacturing apparatus.

The vessel is preferably a packed column.

Preferably, a pretreatment apparatus for removing a catalytic poison to the aluminum oxide from the exhaust gas is further present upstream from the vessel. Also preferably, a pretreatment apparatus for removing $SiF_4$ from the exhaust gas is further present upstream from the vessel.

Preferably, a posttreatment apparatus for removing an acidic gas is further placed downstream from the vessel. The posttreatment apparatus preferably removes the acidic gas by use of water.

According to still another aspect of the present invention, there is provided a method for producing a semiconductor device, including the steps of:

etching a precursor of the semiconductor device with an etching gas containing a fluorine-containing compound or a plasma thereof in a chamber;

discharging an exhaust gas containing a fluorine-containing compound from the chamber; and contacting the exhaust gas with aluminum oxide at a high temperature enough to decompose the fluorine-containing compound, thereby decomposing the fluorine-containing compound in the exhaust gas.

Preferably, the contacting step is performed in the presence of a hydrogen gas ($H_2$) in a molar amount in excess of the amount required to convert the fluorine atoms in the fluorine-containing compound to HF.

According to a further aspect of the present invention, there is provided a method for producing a semiconductor device, including the steps of:

forming a thin film in a chamber of a chemical vapor deposition apparatus by chemical vapor deposition of a thin film-forming gas on a precursor of the semiconductor device;

withdrawing the resulting semiconductor device from the chamber;

cleaning the chamber of the chemical vapor deposition apparatus with a cleaning gas containing a fluorine-containing compound; and contacting an exhaust gas containing a fluorine-containing compound from the cleaning step with aluminum oxide at a high temperature enough to decompose the fluorine-containing compound, thereby decomposing the fluorine-containing compound in the exhaust gas.

Preferably, the contacting step is performed in the presence of a hydrogen gas ($H_2$) in a molar amount in excess of the amount required to convert the fluorine atoms in the fluorine-containing compound to HF.

PREFERRED EMBODIMENTS OF THE INVENTION

Figure 1:
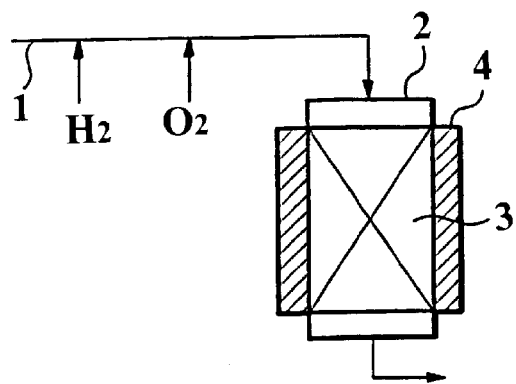
FIG. 1 is an explanatory view of an apparatus according to an embodiment of the present invention.

According to an aspect of the present invention, a fluorine-containing compound is decomposed at a high temperature with the use of aluminum oxide, e.g., γ-alumina, as a catalyst. For example, a perfluorocarbon, such as $C_2F_6$, $C_3F_8$ or $CF_4$, can be decomposed. Also, an organic fluorine compound such as $CHF_3$, or an inorganic fluorine compound such as $SF_6$ or $NF_3$ can be decomposed. That is, the fluorine-carbon bond, fluorine-sulfur bond, or fluorine-nitrogen bond in the fluorine-containing compound can be cleaved.

The fluorine-containing compound includes a chlorofluorocarbon such as $C_2Cl_3F_3$, $C_2Cl_2F_4$, or $C_2ClF_5$. Such a chlorofluorocarbon can also be decomposed. However, the fluorine-containing compound is preferably free from a chlorine atom, and is more preferably free from any of a chlorine atom, a bromine atom, and an iodine atom.

According to an embodiment of the present invention, the decomposition efficiency for the fluorine-containing compound is increased markedly by adding an $H_2$ gas, particularly an $H_2$ gas and an $O_2$ gas, into the exhaust gas. By using an $H_2$ gas, the fluorine-containing compound can be decomposed into HF.

An embodiment in which an $H_2$ gas and an $O_2$ gas are both added will be described mainly.

When a fluorine-containing compound, such as $C_2F_6$, $C_3F_8$ or $CF_4$, is contacted with γ-alumina, which has been heated to a high temperature, in the presence of sufficient amounts of a hydrogen gas and an oxygen gas, this compound is decomposed into $CO_2$ and HF in accordance with the following reaction scheme:

$$C_2F_6 + 3H_2 + 3O_2 \rightarrow 2CO_2 + 6HF + O_2$$

$$C_3F_8 + 4H_2 + 4O_2 \rightarrow 3CO_2 + 8HF + O_2$$

$$CF_4 + 2H_2 + 2O_2 \rightarrow CO_2 + 4HF + O_2$$

When $SF_6$ or $NF_3$ is subjected to a similar reaction in an oxidizing atmosphere having an excess of oxygen, the following reaction takes place to decompose the compound:

$$SF_6 + 3H_2 + 2O_2 \rightarrow SO_2 + 6HF + O_2$$

$$2NF_3 + 3H_2 + 3O_2 \rightarrow 2NO_2 + 6HF + O_2$$

When $CHF_3$ is subjected to a similar reaction in an oxidizing atmosphere having an excess of oxygen, the following reaction takes place to decompose the compound:

$$CHF_3 + H_2 + 2O_2 \rightarrow CO_2 + 3HF + O_2$$

In view of the above findings, in an embodiment of the present invention, a fluorine-containing compound is brought into contact with aluminum oxide in the presence of a hydrogen gas ($H_2$) in a molar amount in excess of the amount required to convert the fluorine atoms in the fluorine-containing compound to HF. If the fluorine-containing compound contains an H atom, for example, like $CHF_3$, the hydrogen gas may be added such that the total number of the hydrogen atom in the fluorine-containing compound and the hydrogen atoms in the hydrogen gas added ($H_2$) is not less than the number of moles of the fluorine atoms in the fluorine-containing compound. More preferably, the contacting step is performed in the presence of 1.5 or more times as many as the molar amount of a hydrogen gas ($H_2$) required to convert the fluorine atoms in the fluorine-containing compound to HF.

Even when $H_2$ is present in an amount sufficient to react with the fluorine atoms in the fluorine-containing compound, if the amount of $O_2$ added is not more than the number of moles of the carbon atoms, $C_2F_6$ is decomposed into $CO_2$ and HF, and a large amount of CO is also produced, for example, according to the following scheme:

$$2C_2F_6+6H_2+3O_2 \rightarrow 2CO_2+2CO+12HF$$

In view of the above facts, in an embodiment of the present invention, it is preferred that decomposition is performed in the presence of $O_2$ in a molar amount in excess of the amount required to convert the carbon atom in the fluorine-containing compound to $CO_2$, the sulfur atom in the fluorine-containing compound to $SO_2$, or the nitrogen atom in the fluorine-containing compound to $NO_2$. It is more preferred that decomposition is performed in the presence of $O_2$ in an amount of 1.5 or more times as many as this number of moles.

As the aluminum oxide, γ-alumina, δ-alumina or θ-alumina can be used, and γ-alumina is preferred. The aluminum oxide may contain a trace amount of silicon, boron, or a transition metal such as iron, chromium, nickel, palladium, or platinum. The surface of the aluminum oxide may be treated with a coating.

The shape of the aluminum oxide is not restricted, and may be particulate, powdery, or honeycomb-like. If it is particulate or powdery, a spherical particulate or powdery shape is preferred when handled.

The particle size of the aluminum oxide is in a range in which air flow resistance does not increase when the exhaust gas is passed through the aluminum oxide. To impart a large contact area, fine particles of the aluminum oxide are satisfactory. For example, the desirable particle size is 0.8 to 2.6 mm.

The specific surface area of the alumina is preferably 100 to 400 $m^2/g$, and more preferably 120 to 300 $m^2/g$.

The temperature of the aluminum oxide may be a high temperature at which its catalytic activity is obtained. The temperature depends on the fluorine-containing compound, and in the case of $C_2F_6$, $C_3F_8$, $CF_4$, $CHF_3$, $SF_6$ or $NF_3$, for example, the range of 800 to 900° C. is preferred. For a chlorofluoro compound with the fluorine atoms substituted by chlorine atoms, the reaction temperature may be lower, as the number of the chlorine atoms increases.

Figure 2:
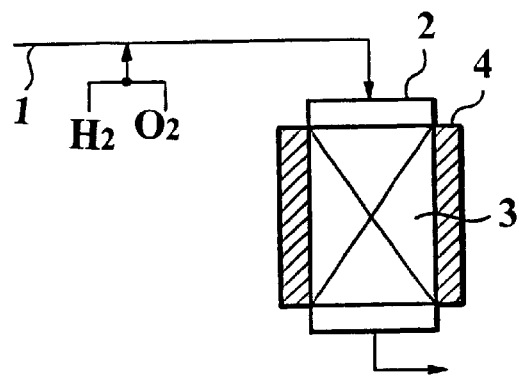
FIG. 2 is an explanatory view of an apparatus according to another embodiment of the present invention.
Figure 3:
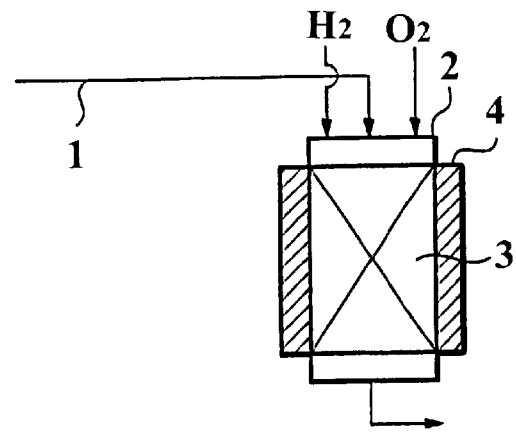
FIG. 3 is an explanatory view of an apparatus according to still another embodiment of the present invention.

The apparatus according to the embodiments of the present invention is shown in FIGS. 1 to 3. In FIG. 1, $H_2$ and $O_2$ are introduced into an exhaust gas 1 separately. In FIG. 2, $H_2$ and $O_2$ are introduced into an exhaust gas 1 simultaneously. In FIG. 3, an exhaust gas 1, $H_2$ and $O_2$ are introduced into a packed column 2 separately. In these drawings, the numeral 3 denotes γ-alumina, and the numeral 4 denotes a heater.

As described above, $H_2$ may be added to an exhaust gas, and then $O_2$ may be added to the exhaust gas. Alternatively, both $H_2$ and $O_2$ may be added to an exhaust gas. Furthermore, an exhaust gas, $H_2$ and $O_2$ may be introduced into a packed column 2 at a time, and the exhaust gas, $H_2$ and $O_2$ may be mixed inside the packed column 2.

A feeder for feeding $H_2$ includes, for example, a high pressure cylinder for storing a hydrogen gas, and a regulator for controlling the pressure and flow rate of the hydrogen gas fed. A feeder for feeding $O_2$ includes, for example, a high pressure cylinder for storing an oxygen gas, and a regulator for controlling the pressure and flow rate of the hydrogen gas fed.

In FIGS. 1, 2 and 3, a mixed gas containing an $H_2$ gas and an $O_2$ gas and an exhaust gas are introduced into the packed column 2 as downward streams. However, they may be introduced as upward streams, rather than downward streams.

The exhaust gas after having passed through the packed column 2 contains HF. Thus, the exhaust gas is released to the atmosphere after removal of HF by such a measure as its passage through a water scrubber tower already installed. Also, carbon monoxide (CO) is decomposed and removed, if desired, by means of an oxidation catalyst or the like.

Figure 4:
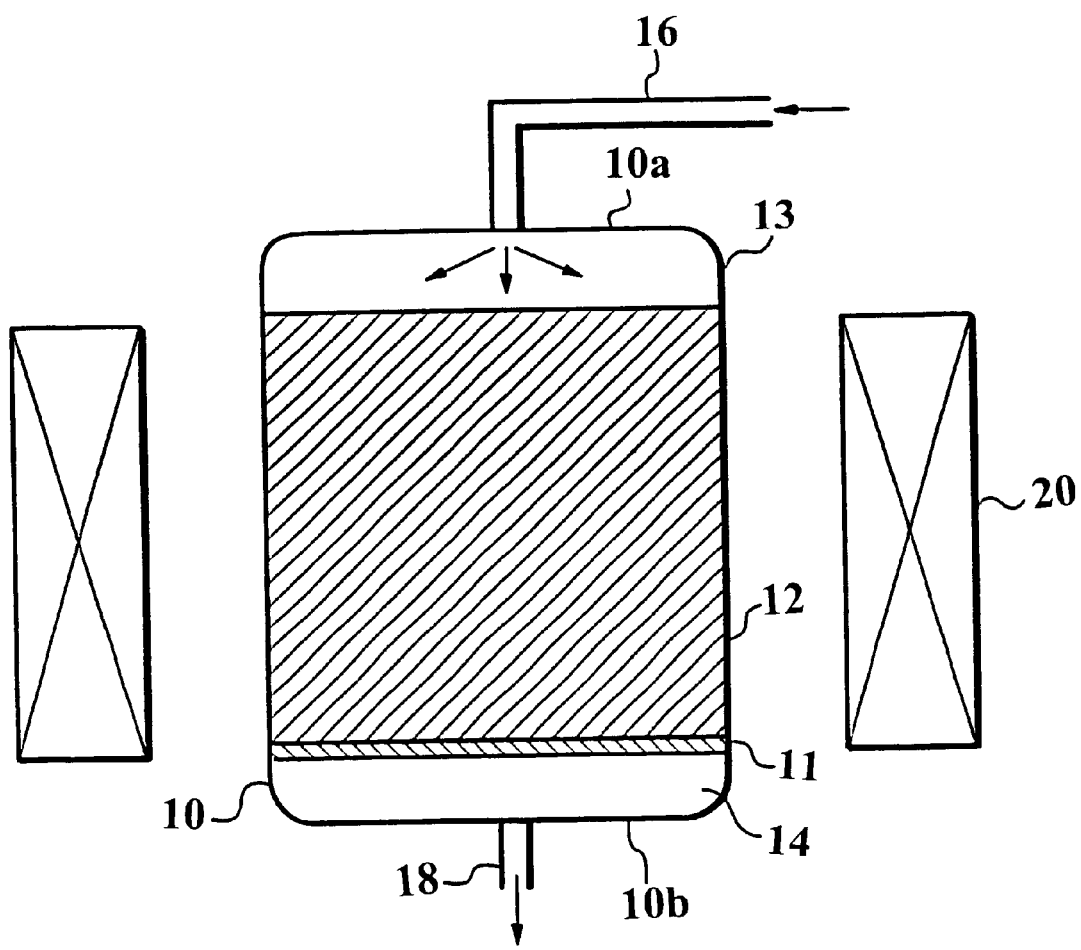
FIG. 4 is an explanatory sectional view of an apparatus according to a further embodiment of the present invention.

FIG. 4 shows an embodiment of the apparatus of the present invention. In the apparatus, a passage 16 for introducing an exhaust gas containing a fluorine-containing compound into a vessel 10 is connected to a top 10a of the vessel 10, and a passage 18 for discharging a treated gas from the vessel 10 is connected to a bottom 10b of the vessel 10. The passage 16 is connected, for example, to an outlet of a semiconductor device manufacturing apparatus.

The vessel 10 includes a support floor 11 provided in a lower portion thereof, aluminum oxide 12 supported on the support floor 11, a first gap 13 above the aluminum oxide 12, and a second gap 14 below the aluminum oxide 12. The support floor 11 has many small holes of such a size as to allow the exhaust gas to pass therethrough, but does not allow the aluminum oxide 12 to pass therethrough. The support floor is, for example, a plate-like member composed of stainless steel. The gap 13 and the second gap 14 are of a sufficient size to allow the exhaust gas or mixed gas fed through the passage 16 to flow into and from the aluminum oxide 12 at a constantly desired speed.

Unlike the embodiment of FIG. 4, the exhaust gas may be introduced through the passage 18, and the treated gas may be discharged through the passage 16.

Outside the vessel 10, a heater 20 capable of heating the aluminum oxide 12 is provided. There is no restriction on the heater 20. The heater may be an electric heater, or the aluminum oxide may be heated with a heating medium, or the outside of the packed column 2 may be heated by a burner.

The manufacturing apparatus for the semiconductor device is, for example, an etching apparatus or a chemical vapor deposition (CVD) apparatus. The exhaust gas generated by the manufacturing apparatus for the semiconductor device includes an exhaust gas produced in a semiconductor device manufacturing process, and an exhaust gas generated during cleaning of the manufacturing apparatus after production of the semiconductor device.

The semiconductor device is not limited, and includes diodes, transistors, thyristors, memories such as ROM and RAM, and CPU.

The precursor of the semiconductor device includes, for example, a substrate comprising a semiconductor, and a precursor having a thin film laminated on the substrate. The semiconductor of the substrate includes Group IV elements such as silicon, and compound semiconductors such as III–V compound semiconductors and II–VI compound semiconductors.

During etching of the precursor of the semiconductor device with an etching gas or its plasma, an exhaust gas is discharged. The etching step in the method of manufacturing a semiconductor device is described, for example, in Japanese Patent Publication No. 14151/1981, and Japanese Patent Publication No. 45310/1982. The entire disclosure of Japanese Patent Publication No. 14151/1981 and Japanese Patent Publication No. 45310/1982 is incorporated herein by reference. Furthermore, semiconductor manufacturing methods and semiconductor devices are described in Jacqueline I. Kroschwitz, Mary Howe-Grant, "Kirk-Othmer Encyclopedia of Chemical Technology", Ed. 4, Vol. 21, 720–816, John Wiley & Sons, Inc., 1997. The entire description of this book is cited herein. Semiconductor devices are also described in M. S. Tyagi, "Introduction to Semiconductor Materials and Devices," John Wiley & Sons, Inc., 1991, pp. 299–562. These descriptions are incorporated in the specification by reference. Manufacturing methods for semiconductor devices are described in "Introduction to Semiconductor Materials and Devices," pp. 563–612. These descriptions are also incorporated in the specification by reference.

The etching includes sputter etching for etching by physical impact of an etching gas, reactive ion etching for etching by the synergistic effect of physical impact of an etching gas and a chemical reaction with the etching gas, and plasma etching for etching by a chemical reaction with an etching gas without substantially involving physical impact of an etching gas.

In sputter etching, a fluorinated hydrocarbon such as $CF_4$, $CHF_3$ or $C_2F_6$ is used preferably as an etching gas. In reactive ion etching and plasma etching, $BCl_3$, $BF_3$ or $Cl_2$ is used preferably as an etching gas.

Figure 5:
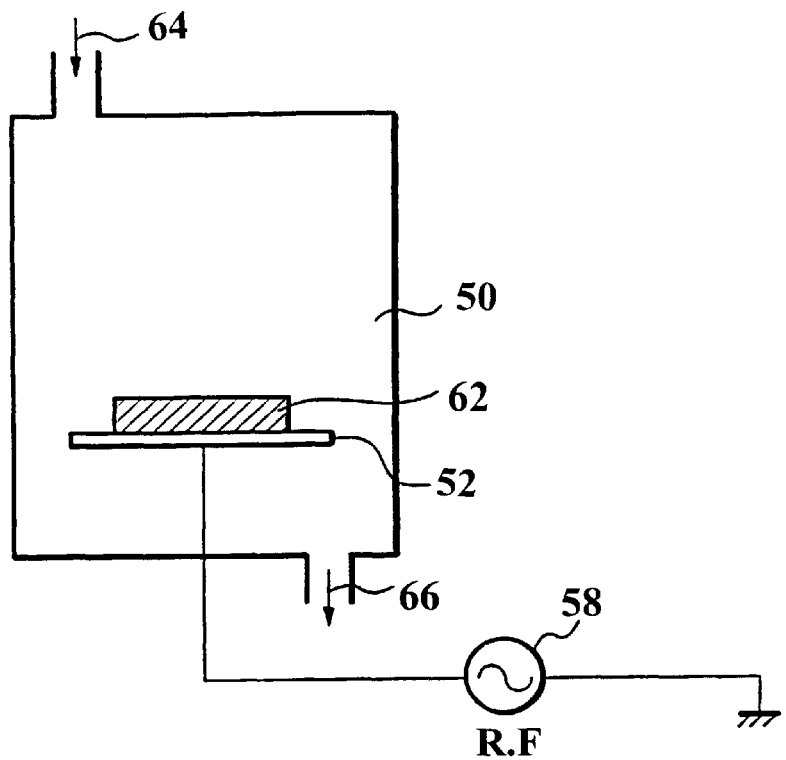
FIG. 5 is an explanatory view of an embodiment of an etching apparatus.

FIG. 5 is an explanatory view of an embodiment of an etching apparatus. The etching apparatus has a vacuum chamber 50, and an electrode 52 placed inside the vacuum chamber 50. The electrode 52 is connected to a high frequency voltage 58. On the electrode 52, a precursor 62 of a semiconductor device, for example, a semiconductor wafer is placed. A high frequency voltage is applied to the electrode 52, with an etching gas 64 flowing into the vacuum chamber 50, whereby sputter etching or reactive ion etching of the precursor 62 of the semiconductor device is performed. In this case, the type of the etching gas 64 determines whether sputter etching or reactive ion etching is performed. An exhaust gas 66 is discharged from the vacuum chamber, and introduced into an exhaust gas treatment apparatus.

Figure 6:
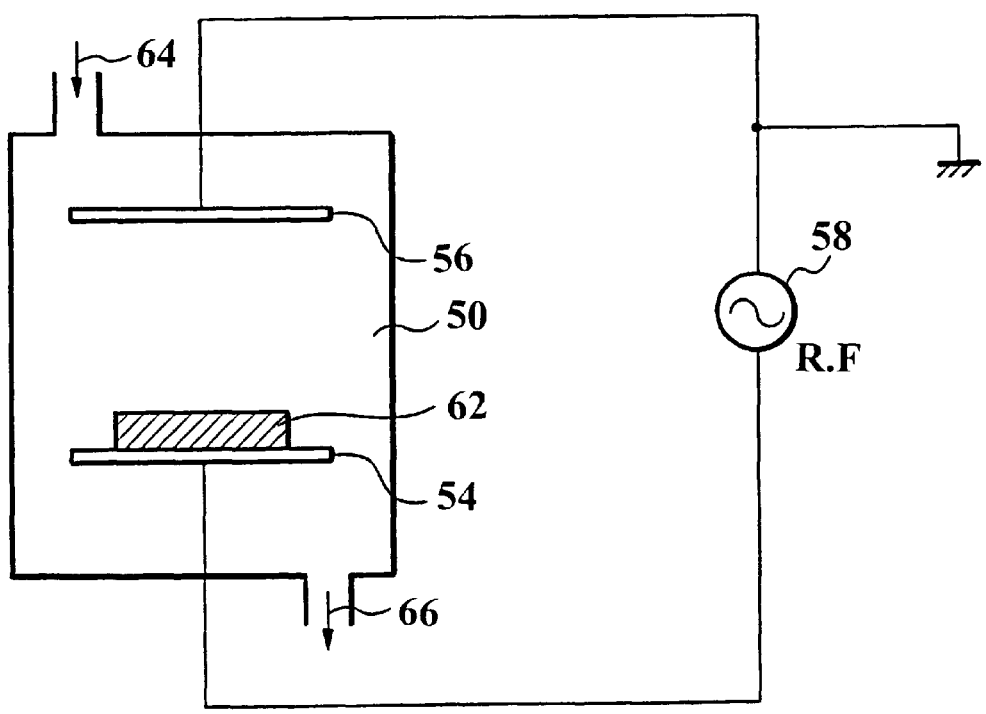
FIG. 6 is an explanatory view of another embodiment of an etching apparatus.

In FIG. 5, a single electrode is used. However, a pair of electrodes 54 and 56 may be used, as shown in FIG. 6. In FIG. 6, a high frequency voltage 58 is applied to an electrode 54 and an electrode 56, with an etching gas 64 flowing into a vacuum chamber 50, whereby sputter etching or reactive ion etching is performed for a precursor 62 of a semiconductor device placed on the electrode 54. An exhaust gas 66 is discharged from the vacuum chamber, and introduced into an exhaust gas treatment apparatus.

Figure 7:
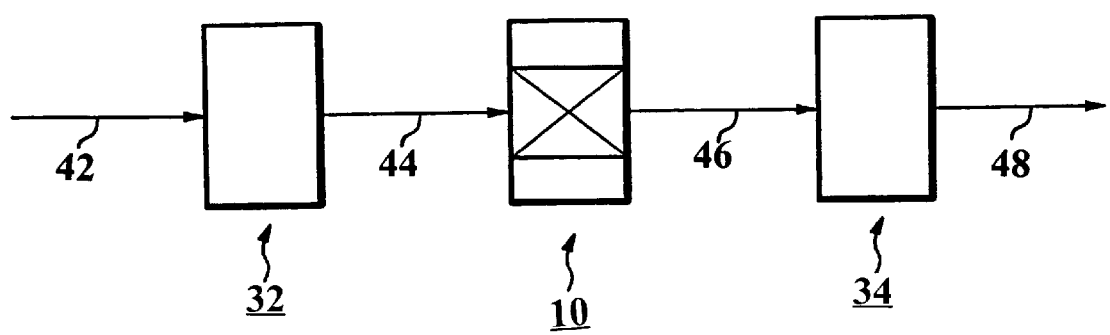
FIG. 7 is an explanatory view of an apparatus according to a still further embodiment of the present invention.

FIG. 7 is an explanatory view of another embodiment of the present invention. An exhaust gas containing a fluorine-containing compound, which has been discharged from a semiconductor device manufacturing apparatus or the like, is introduced via a line 42 into a pretreatment apparatus 32 for removing a fluorine-containing inorganic compound, etc. Then, the exhaust gas is introduced via a line 44 into a packed column 10 containing aluminum oxide. Then, the treated gas is introduced via a line 46 into a posttreatment apparatus 34 for removing an acidic gas such as HF, and discharged through a line 48. As the packed column 10, that shown, for example, in FIG. 4 can be used.

The pretreatment apparatus is, for example, a dry apparatus charged with a solid chemical such as zeolite, or a wet apparatus using a liquid chemical.

The exhaust gas discharged from the semiconductor device manufacturing apparatus may contain tetrafluorosilicon ($SiF_4$) and an oxygen gas ($O_2$) along with tetrafluorocarbon ($CF_4$). Tetrafluorosilicon ($SiF_4$) and an oxygen gas ($O_2$) react with each other to form solid silicon oxide ($SiO_2$). That is, when the exhaust gas containing tetrafluorosilicon ($SiF_4$) and an oxygen gas ($O_2$) along with tetrafluorocarbon ($CF_4$) is contacted with aluminum oxide, solid silicon oxide ($SiO_2$) may be formed on the surface of the aluminum oxide, lowering the ability of the aluminum oxide to decompose a fluorine-containing compound.

Thus, it is preferred to decompose and remove a catalytic poison in the exhaust gas, such as $SiF_4$, in the pretreatment apparatus before the exhaust gas is brought into contact with aluminum oxide. For example, the exhaust gas is passed through a packed column packed with a solid chemical such as zeolite, whereby $SiF_4$ can be decomposed and removed.

Alternatively, a fluorine-containing compound such as HF can be removed by spraying the exhaust gas with water, preferably, an alkaline liquid chemical, or by introducing the exhaust gas into water, preferably, an alkaline liquid chemical and bubbling it.

Apparatuses usable as the pretreatment apparatus 32 are described, for example, in Japanese Patent Application No. 168572/1998 entitled "Method for Treating Exhaust Gas Containing Inorganic Halogenated Gas." The entire disclosure of this application is incorporated herein by reference.

The aluminum oxide in the packed column 10 decomposes a fluorine-containing compound, especially a fluorine-containing organic compound, into hydrogen fluoride (HF). Thus, the exhaust gas discharged from the packed column 10 contains a large amount of hydrogen fluoride. Hence, it is preferred to remove HF by a posttreatment apparatus.

The posttreatment apparatus for removing an acidic gas such as HF is, for example, a dry apparatus such as a packed column packed with an anion exchange resin, or a wet apparatus using water. The wet apparatus is, for example, a sprayer for spraying the exhaust gas with water, preferably, an alkaline liquid chemical, or a device for introducing the exhaust gas into water, preferably, an alkaline liquid chemical and bubbling it.

The spraying device and the bubbling device as the pretreatment apparatus and the posttreatment apparatus are described, for example, in WO99/24151 and WO99/20374. The entire disclosure of these international publications is incorporated herein by reference.

EXAMPLES

The present invention will now be described concretely by way of Examples, but the invention is not restricted thereby.

Reference Examples 1 to 4

A quartz column with a diameter of 25 mm was used, and packed with a treating agent to a layer height of 100 mm.

The packed column was mounted in a ceramic electric tubular furnace, and the treating agent layer was heated to 700° C. A gas of $C_2F_6$ alone diluted with an $N_2$ gas was passed through the treating agent layer. The flow rate of the gas was 408 sccm, and the SV was set at 500 $hr^{-1}$. The inlet gas concentration of $C_2F_6$ was adjusted to 1%.

To investigate the treating performance, the outlet gas was analyzed, where necessary. When the removal rate of $C_2F_6$ lowered to 90% or less, passage of the gas was stopped, and the amount of $C_2F_6$ treated was determined based on the amount of the gas passed by then. The analysis of $C_2F_6$ was made using a gas chromatograph equipped with a TCD detector.

The treating agents used were all commercially available products of Mizusawa Kagaku. The treating agents were γ-alumina (Neobead GB-26) in Reference Example 1, HY zeolite (Mizuka Sieves Y-520) in Reference Example 2, H mordenite (H Mordenite) in Reference Example 3, and H-ZSM-5 zeolite (Mizuka Sieves EX-122-H) in Reference Example 4. In any of the Reference Examples, the shape of the treating agent was particulate, and the particle sizes were 2.6 mm, 1 mm, 1 mm, and 1.5 mm, respectively. The results are shown in Table 1.

TABLE 1

| | Treating Agent | Amount of $C_2F_6$ treated (liter/liter) |
|---|---|---|
| Reference Example 1 | γ-alumina | 8.0 |
| Reference Example 2 | HY zeolite | 0.1 |
| Reference Example 3 | H mordenite | 2.5 |
| Reference Example 4 | H-ZSM-5 zeolite | 1.3 |

The γ-alumina of Reference Example 1 was higher in performance than the H zeolites of Reference Examples 2 to 4.

Example 1 and Comparative Examples 1 to 3

The same testing equipment as in the preceding Reference Examples was used, and the column was packed with only γ-alumina as the treating agent. The amount packed and the particle diameter were the same, and $O_2$ and $H_2$ as gases added were mixed, in arbitrary proportions, with $C_2F_6$ diluted with an $N_2$ gas. In Example 1, the amount of $H_2$ added was set such that the H atomic weight was at an equal atomic ratio to the fluorine atomic weight of $C_2F_6$, and the amount of $O_2$ added was not less than equimolar relative to $H_2$ introduced.

In Comparative Examples 1 and 2, the gases added were $O_2$ alone and $H_2$ alone, respectively. In Comparative Example 3, $O_2$ and $H_2$ were both added, but the amount of $H_2$ was in excess of $O_2$. The treating temperature was 800° C. in all of the Examples. The analysis of $C_2F_6$, $O_2$, $H_2$, CO and $CO_2$ in the inlet gas and the outlet gas was quantitatively made by using a gas chromatograph equipped with a TCD detector. To investigate the treating performance, the outlet gas was analyzed, where necessary. When the removal rate of $C_2F_6$ lowered to 95% or less, passage of the gas was stopped, and the amount of $C_2F_6$ treated was determined based on the amount of the gas passed by then.

The results are shown in Table 2 below. The concentrations of the respective components in the outlet gas are values at a $C_2F_6$ removal rate of 95%.

In Comparative Example 1, $H_2$ was not added, and the reaction in this case proceeds as follows:

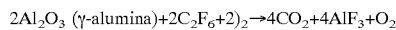

$2Al_2O_3$ (γ-alumina)+$2C_2F_6$+2)$_2$→$4CO_2$+$4AlF_3$+$O_2$

As noted above, the catalyst, γ-alumina, changes into $AlF_3$, so that the catalytic activity declines and the life of the catalyst shortens. This reaction also occurs when the amount of $H_2$ added is smaller than the fluorine atomic weight of $C_2F_6$. In this case, the catalyst, γ-alumina, changes, and the catalytic activity lowers. On the other hand, when $H_2$ is added in an equal amount or more, the fluorine atoms in $C_2F_6$ become HF. Thus, $AlF_3$ does not form, the catalyst, γ-alumina, does not react, and the catalytic activity does not decline.

In Example 1, $H_2$ and $O_2$ were added in the aforementioned mixing ratio. As a result, the amount of carbon monoxide (CO) formed was decreased, and the amount of $C_2F_6$ dramatically increased to 117 liters/liter. In Comparative Example 1 with the addition of $O_2$ alone, generation of carbon monoxide (CO) was decreased, but the life of the catalyst was short. When $H_2$ was added alone, or $H_2$ was introduced in an amount exceeding that of $O_2$, carbon monoxide (CO) occurred in a large amount, and the amount of treatment was small.

Examples 2, 3 and Comparative Example 4

The same testing equipment as in the preceding Examples was used, and γ-alumina was used. The particle diameter was 0.8 mm, and the same amount packed was employed. $H_2$ and $O_2$ as gases added were added to $C_2F_6$ diluted with an $N_2$ gas. That is, the amount of $H_2$ was set such that the hydrogen atoms had an equal atomic ratio to the fluorine atoms of $C_2F_6$, and the amount of $O_2$ gas was not less than equimolar relative to the hydrogen gas introduced. In Examples 2 and 3, the temperature of the treating agent layer was 800° C. and 900° C., respectively. In Comparative Example 4, the temperature was lowered to 700° C.

The analysis of the respective components in the inlet gas and the outlet gas was made by gas chromatography. $C_2F_6$ in the outlet gas was analyzed where necessary, and the amount of $C_2F_6$ treated was determined based on the amount of the gas passed, when the removal rate of $C_2F_6$ lowered to 95% or less.

The results are shown in Table 2 below. The concentrations of the respective components in the outlet gas are values at a $C_2F_6$ removal rate of 95%.

In Examples 2 and 3, in which $C_2F_6$ was treated at the temperature of 800° C. and 900° C., occurrence of carbon monoxide (CO) was minimal, and the amount of treatment was large. In Comparative Example 4, in which the treating temperature was lowered to 700° C., the ability to decompose $C_2F_6$ considerably lowered.

TABLE 2

| | Treating agent | Treating agent layer temp. (° C.) | Total gas inflow (sccm) | Concentrations in inlet gas | | | Concentrations in outlet gas | | | Amount of $C_2F_6$ treated (l/l) |
|---|---|---|---|---|---|---|---|---|---|---|
| | | | | $C_2F_6$ (%) | $O_2$ (%) | $H_2$ (%) | $C_2F_6$ (ppm) | CO (ppm) | $CO_2$ (ppm) | |
| Ex. 1 | γ-alumina | 800 | 413 | 1.13 | 5.2 | 3.5 | 630 | 140 | 15800 | 117 |
| Comp. Ex. 1 | γ-alumina | 800 | 418 | 1.32 | 3.5 | 0 | 690 | 190 | 17700 | 6.8 |
| Comp. Ex. 2 | γ-alumina | 800 | 400 | 1.45 | 0 | 7.6 | 770 | 10000 | 5000 | 7.1 |
| Comp. Ex. 3 | γ-alumina | 800 | 418 | 1.41 | 3.4 | 7.4 | 800 | 9300 | 9200 | 11 |
| Ex. 2 | γ-alumina | 800 | 408 | 1.16 | 5.7 | 3.6 | 580 | 90 | 23200 | 120 |
| Ex. 3 | γ-alumina | 900 | 408 | 1.18 | 5.6 | 3.5 | 590 | 70 | 23600 | 100 |
| Comp. Ex. 4 | γ-alumina | 700 | 408 | 1.16 | 5.8 | 3.5 | 580 | 1500 | 16300 | 5.8 |

Examples 4, 5 and Comparative Example 5

The same testing equipment as in the preceding Example 1 was used, and γ-alumina was used. The particle diameter was 0.8 mm, and the same amount packed was employed. $H_2$ and $O_2$ as gases added were added to $C_3F_8$ diluted with an $N_2$ gas. The amount of $H_2$ was set such that the hydrogen atoms had an equal atomic ratio to the fluorine atoms of $C_3F_8$, and the amount of $O_2$ was not less than equimolar relative to the amount of $H_2$ introduced. In Examples 4 and 5, the temperature of the treating agent layer was 800° C. and 900° C., respectively. In Comparative Example 5, the temperature was 700° C. The analysis of the respective components in the inlet gas and the outlet gas was made by gas chromatography. $C_3F_8$ in the outlet gas was analyzed where necessary, and the amount of $C_3F_8$ treated was determined based on the amount of the gas passed, when the removal rate of $C_3F_8$ lowered to 95% or less.

The results are shown in Table 3 below. The concentrations of the respective components in the outlet gas are values at a $C_3F_8$ removal rate of 95%.

such as H mordenite and H-ZSM-5 zeolite, other than γ-alumina was low.

In Comparative Example 6, γ-alumina changes into $AlF_3$ according to the following reaction scheme, resulting in its deterioration:

$$4Al_2O_3 + 3C_3F_8 + 4O_2 \rightarrow 9CO_2 + 8AlF_3 + O_2$$

When γ-alumina deteriorates, its catalytic activity declines and its life shortens.

On the other hand, when $H_2$ is added such that its atomic weight is not less than the fluorine atomic weight of $C_3F_8$, the fluorine atoms in $C_3F_8$ become HF. Thus, no $AlF_3$ forms, and there is no decline in the catalytic activity of γ-alumina.

TABLE 3

| | Treating agent | Treating agent layer temp. (° C.) | Total gas inflow (sccm) | Concentrations in inlet gas | | | Concentrations in outlet gas | | | Amount of $C_2F_6$ treated (l/l) |
|---|---|---|---|---|---|---|---|---|---|---|
| | | | | $C_3F_8$ (%) | $O_2$ (%) | $H_2$ (%) | $C_3F_8$ (ppm) | CO (ppm) | $CO_2$ (ppm) | |
| Ex. 4 | γ-alumina | 800 | 408 | 1.14 | 5.6 | 4.6 | 570 | 90 | 34100 | 110 |
| Ex. 5 | γ-alumina | 900 | 408 | 1.15 | 5.6 | 4.6 | 580 | 65 | 34300 | 95 |
| Comp. Ex. 5 | γ-alumina | 700 | 408 | 1.14 | 5.7 | 4.6 | 270 | 2600 | 23700 | 5.0 |
| Comp. Ex. 6 | γ-alumina | 800 | 408 | 1.14 | 5.6 | 0 | 570 | 180 | 26100 | 6.4 |
| Comp. Ex. 7 | γ-alumina | 800 | 408 | 1.15 | 0 | 7.5 | 580 | 11500 | 11000 | 7.0 |
| Comp. Ex. 8 | γ-alumina | 800 | 408 | 1.14 | 3.8 | 7.6 | 570 | 11000 | 13500 | 11 |
| Comp. Ex. 9 | H mordenite | 800 | 408 | 1.15 | 5.6 | 4.6 | 580 | 20000 | 15000 | 6.5 |
| Comp. Ex. 10 | H-ZSM-5 zeolite | 800 | 408 | 1.14 | 5.6 | 4.6 | 570 | 1500 | 13500 | 4.3 |

The present method of treatment was found to exhibit high performance for $C_3F_8$.

Comparative Examples 6 to 10

The same testing equipment and treating agents as used in Tables 1 and 2 were used. The amount packed and the particle diameter were the same, and $O_2$ and $H_2$ as gases added were mixed, in arbitrary proportions, with $C_3F_8$ diluted with an $N_2$ gas.

In Comparative Examples 6 to 8, γ-alumina was used. In Comparative Examples 9 and 10, H mordenite and H-ZSM-5 zeolite, which showed the next best performance after γ-alumina, were used. In Comparative Examples 6 and 7, the gases added were $O_2$ alone and $H_2$ alone, respectively. In Comparative Example 8, the amount of $H_2$ added was in excess of that of $O_2$. In Comparative Examples 9 and 10, the amount of $H_2$ added was set such that the H atomic weight was at an equal atomic ratio to the fluorine atomic weight of $C_3F_8$, and the amount of $O_2$ added was not less than equimolar relative to the amount of $H_2$ introduced.

The treating temperature was 800° C. The analysis of the respective components in the inlet gas and the outlet gas was made by gas chromatography. $C_3F_8$ in the outlet gas was analyzed where necessary, and the amount of $C_3F_8$ treated was determined based on the amount of the gas passed, when the removal rate of $C_3F_8$ lowered to 95% or less.

The results are shown in Table 3 below. The concentrations of the respective components in the outlet gas are values at a $C_3F_8$ removal rate of 95%.

Upon decomposition of $C_3F_8$ with γ-alumina, the amounts treated were not large, when $O_2$ was added alone, $H_2$ was added alone, and $H_2$ was added in an amount exceeding the amount of $O_2$. Even when $H_2$ and $O_2$ were mixed in the optimum ratio, the treating performance of H-type zeolites, Examples 6, 7 and Comparative Example 11

The same testing equipment as in Example 1 was used. The particle diameter of γ-alumina was 0.8 mm, and the same amount packed was employed. $H_2$ and $O_2$ as gases added were added to $CF_4$ diluted with an $N_2$ gas. The amount of $H_2$ added was such that the H atoms was at an equal atomic ratio to the F atoms of $CF_4$, and the amount of $O_2$ gas added was not less than equimolar relative to the amount of $H_2$ gas. In Examples 6 and 7, the temperature of the treating agent layer was 800° C. and 900° C., respectively. In Comparative Example 11, the temperature was 700° C. The analysis of the respective components in the inlet gas and the outlet gas was made by gas chromatography. $CF_4$ in the outlet gas was analyzed where necessary, and the amount of $CF_4$ treated was determined based on the amount of the gas passed, when the removal rate of $CF_4$ lowered to 95% or less.

The results are shown in Table 4 below. The concentrations of the respective components in the outlet gas are values at a $CF_4$ removal rate of 95%.

The present method of treatment was found to exhibit high performance for $CF_4$.

Comparative Examples 12 to 16

The same testing equipment and treating agents as used in Tables 1 and 2 were used. The amount packed and the particle diameter were the same, and $O_2$ gas and $H_2$ gas in arbitrary proportions were mixed with $CF_4$ diluted with an $N_2$ gas.

In Comparative Examples 12 to 14, γ-alumina was used. In Comparative Examples 15 and 16, H mordenite and H-ZSM-5 zeolite, which showed the next best performance after γ-alumina, were used. In Comparative Examples 12 and 13, the gases added were $O_2$ alone and $H_2$ alone, respectively. In Comparative Example 14, the amount of $H_2$ added was in excess of that of $O_2$. In Comparative Examples 15 and 16, the amount of $H_2$ added was set such that the H atomic weight was at an equal atomic ratio to the fluorine atomic weight of $CF_4$, and the amount of $O_2$ gas added was not less than equimolar relative to the amount of $H_2$ gas introduced.

The treating temperature was 800° C. The analysis of the respective components in the inlet gas and the outlet gas was made by gas chromatography. $CF_4$ in the outlet gas was analyzed where necessary, and the amount of $CF_4$ treated was determined based on the amount of the gas passed, when the removal rate of $CF_4$ lowered to 95% or less.

The results are shown in Table 4 below. The concentrations of the respective components in the outlet gas are values at a $CF_4$ removal rate of 95%.

Upon decomposition of $CF_4$ with γ-alumina, the amounts treated were not large, when the gas added was $O_2$ alone (Comparative Example 12), $H_2$ alone (Comparative Example 13), and $H_2$ added in excess of $O_2$ (Comparative Example 14). Even when $H_2$ and $O_2$ added were mixed in the optimum ratio, the treating performance of H-type zeolites, such as H mordenite (Comparative Example 15) and H-ZSM-5 zeolite (Comparative Example 16), other than γ-alumina, was low.

In Comparative Example 12, γ-alumina changes into $AlF_3$ according to the following reaction scheme, and deteriorates:

$$2Al_2O_3 + 3CF_4 \rightarrow 3CO_2 + 4AlF_3$$

When γ-alumina deteriorates, its catalytic activity declines and its life shortens.

On the other hand, when $H_2$ is added in such an amount as to be not less than the amount of the fluorine atoms of $CF_4$, the fluorine atoms in $CF_4$ are converted to HF. Thus, no $AlF_3$ forms, and there is no decline in the catalytic activity of γ-alumina.

described below. The outlet gas was analyzed where necessary, to investigate the treating performance of $CF_4$. The experimental conditions are shown below.

A nitrogen gas containing $CF_4$, $H_2$ and $O_2$ of the concentrations shown below was continuously passed for 1 to 2 hours. Then, a nitrogen gas containing $H_2$ and $O_2$ of the concentrations shown below was introduced for about 1 hour to discharge F remaining in the treating agent as HF. Then, a nitrogen gas containing $CF_4$, $H_2$ and $O_2$ of the concentrations shown below was continuously passed again for 1 to 2 hours. This cycle was repeated.

<Experimental Conditions>

① Inflow concentrations:

| | |
|---|---|
| $CF_4$ | 1% |
| $H_2$ | 3.0% |
| $O_2$ | 5.7% |

The amount of $H_2$ introduced was equivalent (2%) to the amount of F in $CF_4$, and $O_2$ was in excess of $H_2$.

② Total gas flow rate: 408 sccm

③ Amount packed: 49 ml (25 mmΦ×100 mmh)

④ SV: 500 $hr^{-1}$ (corresponding to 125 L/min for a 15L column)

⑤ Treating agent: Neobead GB-08 (a product of Mizusawa Kagaku, principal component: γ-alumina)

⑥ Heater control temperature: 900° C.

<Test Results>

The results are shown in Table 5. The following facts were demonstrated thereby:

① $CF_4$ could be decomposed and removed at a rate of 100% during the period of 380 min.

② Then, the removal rate gradually declined, but a removal rate of 80% was obtained after a lapse of 720 min.

TABLE 4

| | Treating agent | Treating agent layer temp. (° C.) | Total gas inflow (sccm) | Concentrations in inlet gas | | | Concentrations in outlet gas | | | Amount of $CF_4$ treated (l/l) |
|---|---|---|---|---|---|---|---|---|---|---|
| | | | | $CF_4$ (%) | $O_2$ (%) | $H_2$ (%) | $CF_4$ (ppm) | CO (ppm) | $CO_2$ (ppm) | |
| Ex. 6 | γ-alumina | 800 | 408 | 1.02 | 3.0 | 2.1 | 510 | 5 | 9690 | 52 |
| Ex. 7 | γ-alumina | 900 | 408 | 1.01 | 3.0 | 2.1 | 510 | 5 | 9590 | 47 |
| Comp. Ex. 11 | γ-alumina | 700 | 408 | 1.02 | 3.0 | 2.1 | 510 | 1000 | 8690 | 3.9 |
| Comp. Ex. 12 | γ-alumina | 800 | 408 | 1.02 | 3.0 | 0 | 510 | 100 | 9590 | 4.5 |
| Comp. Ex. 13 | γ-alumina | 800 | 408 | 1.03 | 0 | 4.2 | 500 | 4900 | 4900 | 4.9 |
| Comp. Ex. 14 | γ-alumina | 800 | 408 | 1.02 | 3.0 | 4.2 | 500 | 4700 | 4900 | 5.8 |
| Comp. Ex. 15 | H mordenite | 800 | 408 | 1.02 | 3.0 | 2.1 | 510 | 5100 | 4600 | 2.1 |
| Comp. Ex. 16 | H-ZSM-5 zeolite | 800 | 408 | 1.03 | 3.0 | 2.1 | 510 | 1000 | 8700 | 1.7 |

Example 8

Test for treatment of $CF_4$ was conducted using Neobead GB-08 (a product of Mizusawa Kagaku, principal component: γ-alumina) as γ-alumina.

The same testing equipment as in Example 1 was used, and $CF_4$, $H_2$ and $O_2$ gases were passed under the conditions ③ CO, $CO_2$, HF, $H_2$, and $SiF_4$ were present as by-product gases. The amounts of CO and $H_2$ were in the several ppm range.

④ $CO_2$ was formed in an amount nearly equivalent to that of the carbon atoms of $CF_4$, so that $CF_4$ was completely decomposed.

TABLE 5

Results of CF$_4$ Treatment Test

| Treating Time (min) | Outlet | | | | | | | | Removal rate of CF$_4$ (%) |
| --- | --- | --- | --- | --- | --- | --- | --- | --- | --- |
| | CF$_4$ (ppm) | CO (ppm) | CO$_2$ (%) | HF (ppm) | H$_2$ (ppm) | O$_2$ (%) | total-F (mg/m$^3$) | total-Si (mg/m$^3$) | |
| 0~5 | <1 | <2 | 1.03 | <1 | <2 | 4.3 | <1 | <1 | 100 |
| 5~10 | <1 | <2 | 0.91 | <1 | <2 | 4.4 | <1 | <1 | 100 |
| 10~15 | <1 | <2 | 1.01 | <1 | <2 | 4.3 | <1 | <1 | 100 |
| 15~20 | <1 | <2 | 1.02 | <1 | <2 | 4.3 | <1 | <1 | 100 |
| 20~25 | <1 | <2 | 0.99 | <1 | <2 | 4.3 | <1 | <1 | 100 |
| 25~30 | <1 | <2 | 1.02 | <1 | <2 | 4.5 | <1 | <1 | 100 |
| 30~35 | <1 | <2 | 1.04 | <1 | <2 | 4.3 | <1 | <1 | 100 |
| 35~40 | <1 | <2 | 1.02 | <1 | <2 | 4.4 | <1 | <1 | 100 |
| 40~45 | <1 | <2 | 1.00 | <1 | <2 | 4.3 | <1 | <1 | 100 |
| 45~50 | <1 | <2 | 1.06 | <1 | <2 | 4.3 | <1 | <1 | 100 |
| 50~55 | <1 | <2 | 1.11 | <1 | <2 | 4.3 | 14 | 15 | 100 |
| 55~60 | <1 | <2 | 1.00 | 2 | <2 | 4.4 | 16 | 9.8 | 100 |
| 60~65 | <1 | <2 | 1.01 | 5400 | <2 | 4.3 | 180 | 150 | 100 |
| 65~70 | <1 | <2 | 1.01 | 5400 | <2 | 4.3 | 1820 | 500 | 100 |
| 70~80 | <1 | <2 | 0.99 | 5400 | <2 | 4.3 | 890 | 290 | 100 |
| 80~90 | <1 | <2 | 1.00 | 5400 | <2 | 4.2 | 1100 | 320 | 100 |
| 90~100 | <1 | <2 | 0.99 | 5400 | <2 | 4.2 | 2140 | 490 | 100 |
| 100~110 | <1 | <2 | 1.02 | 5400 | 37 | 4.2 | 1350 | 500 | 100 |
| 110~120 | <1 | <2 | 1.00 | 5400 | 63 | 4.2 | 1320 | 470 | 100 |
| 120~130 | <1 | <2 | 1.02 | 150 | 4.0 | 4.0 | 590 | 190 | 100 |
| 130~140 | <1 | <2 | 1.07 | 140 | 4.9 | 4.2 | 560 | 190 | 100 |
| 140~150 | <1 | <2 | 1.07 | 450 | 4.2 | 4.2 | 1560 | 550 | 100 |
| 150~160 | <1 | <2 | 1.10 | 2100 | 4.1 | 4.2 | 8760 | 2240 | 100 |
| 160~170 | <1 | <2 | 1.07 | 2600 | 4.0 | 4.2 | 11700 | 3180 | 100 |
| 170~180 | <1 | <2 | 1.10 | 3500 | 3.6 | 4.3 | 13000 | 3860 | 100 |
| 180~190 | <1 | 5 | 1.07 | 3500 | 4.1 | 4.1 | 13700 | 3460 | 100 |
| 190~200 | <1 | 5 | 1.05 | 2600 | 4.0 | 4.4 | 13600 | 3330 | 100 |
| 200~210 | <1 | 2 | 1.09 | 2600 | 4.3 | 4.2 | 12300 | 3430 | 100 |
| 210~220 | <1 | 10 | 1.08 | 5400 | 5.5 | 4.2 | 12300 | 3250 | 100 |
| 220~230 | <1 | 5 | 1.02 | 2100 | 21 | 4.3 | 13000 | 3220 | 100 |
| 230~240 | <1 | 8 | 1.03 | 5400 | 3.4 | 4.3 | 13300 | 3570 | 100 |
| 250~260 | <1 | <2 | 1.00 | 3500 | 6.4 | 3.9 | 2160 | 780 | 100 |
| 270~280 | <1 | <2 | 0.99 | 10400 | 7.8 | 4.1 | 9920 | 2330 | 100 |
| 290~300 | <1 | 5 | 1.02 | 10400 | 6.5 | 4.0 | 12500 | 3270 | 100 |
| 310~320 | <1 | 5 | 1.06 | 3500 | 7.1 | 4.2 | 2690 | 1770 | 100 |
| 330~340 | <1 | 5 | 1.04 | 10400 | 6.4 | 4.1 | 2610 | 1700 | 100 |
| 350~360 | <1 | 5 | 1.04 | 10400 | 6.1 | 4.1 | 29800 | 7850 | 100 |
| 370~380 | <1 | <2 | 1.07 | 5000 | 5.1 | 3.9 | 1120 | 610 | 100 |
| 410~420 | 4.1 | 6 | 1.06 | 800 | 3.8 | 3.8 | 1570 | 960 | 99.96 |
| 470~480 | 54 | 5 | 1.04 | 950 | 4.2 | 4.0 | 64400 | 30000 | 99.46 |
| 490~500 | 160 | <2 | 0.90 | 3500 | <2 | 4.4 | 1730 | 1230 | 98.4 |
| 530~540 | 390 | 5 | 0.99 | 3500 | 2.2 | 4.2 | 10900 | 3850 | 96.1 |
| 590~600 | 590 | 5 | 0.94 | 5200 | 5.2 | 4.3 | 27000 | 9890 | 94.1 |
| 610~620 | 1020 | 3 | 0.97 | 10400 | 2.1 | 3.9 | 14100 | 3810 | 89.8 |
| 650~660 | 1570 | 3 | 0.92 | 10400 | 83 | 4.0 | 2080 | 1830 | 84.3 |
| 710~720 | 2110 | 3 | 0.90 | 10400 | 93 | 4.0 | 2270 | 840 | 78.9 |

According to the present invention, a fluorine-containing compound in an exhaust gas can be decomposed at a high decomposition rate. Furthermore, treatment can be performed for a long time, without generation of a large amount of CO which is hazardous and difficult to treat.

What is claimed is:

1. A method for decomposing a fluorine-containing compound in an exhaust gas by contacting the exhaust gas containing the fluorine-containing compound with aluminum oxide at a high temperature enough to decompose the fluorine-containing compound, and in the presence of such a necessary or larger number of moles of a hydrogen gas (H$_2$) that the fluorine atoms in the fluorine-containing compound become HF, and in the presence of an oxygen gas whose amount is not less than the number of moles of the hydrogen gas.

2. The method of claim 1, wherein the contacting step is performed in the presence of 1.5 or more times as many as such a necessary number of moles of a hydrogen gas (H$_2$) that the fluorine atoms in the fluorine-containing compound become HF.

3. The method of claim 1, wherein the fluorine-containing compound contains a carbon atom, a sulfur atom, or a nitrogen atom, and the contacting step is performed in the presence of such a necessary or larger number of moles of an oxygen gas (O$_2$) that the carbon atom becomes CO$_2$, the sulfur atom becomes SO$_2$, or the nitrogen atom becomes NO$_2$.

4. The method of claim 3, wherein the necessary or larger number of moles of the oxygen gas has 1.5 or more times as many as the necessary number of moles.

5. The method of claim 1, wherein the aluminum oxide includes γ-alumina.

6. The method of claim 5, wherein the aluminum oxide substantially consists only of γ-alumina.

7. The method of claim 1, wherein the aluminum oxide is particulate.

8. The method of claim 1, wherein the high temperature is in a temperature range of about 800° C. to about 900° C.

9. The method of claim 1, wherein the fluorine-containing compound includes $C_2F_6$, $C_3F_8$, $CF_4$, $CHF_3$, $SF_6$ or $NF_3$.

10. The method of claim 1, wherein the exhaust gas has been discharged from a semiconductor device manufacturing apparatus.

11. The method of claim 1, wherein a catalytic poison to the aluminum oxide is removed from the exhaust gas, and then the contacting step is performed.

12. The method of claim 1, wherein $SiF_4$ is removed from the exhaust gas, and then the contacting step is performed.

13. The method of claim 1, further including a step of removing an acidic gas after the contacting step.

14. The method of claim 13, wherein the acidic gas is removed using water.

* * * * *